United States Patent

[11] 3,602,068

| [72] | Inventor | Graham White<br>Monroe, Conn. |
|---|---|---|
| [21] | Appl. No. | 31,888 |
| [22] | Filed | Apr. 27, 1970 |
| [45] | Patented | Aug. 31, 1971 |
| [73] | Assignee | United Aircraft Corporation<br>East Hartford, Conn. |

[54] SPLIT-POWER TRANSMISSION
14 Claims, 2 Drawing Figs.

[52] U.S. Cl. .................................................. 74/674,
74/661, 416/170, 74/665
[51] Int. Cl. ......................................................... F16h 37/06
[50] Field of Search ............................................. 74/674,
675, 665 G, 665 L, 661; 416/170

[56] References Cited
UNITED STATES PATENTS

| 2,929,198 | 3/1960 | Crocchi ........................ | 74/674 UX |
| 3,255,825 | 6/1966 | Mouille et al. ................ | 74/665 X |
| 3,405,878 | 10/1968 | Lawrence ..................... | 74/675 X |
| 3,455,182 | 7/1969 | Kelley .......................... | 74/661 |

FOREIGN PATENTS

| 454,555 | 1/1950 | Italy ............................ | 74/674 |

Primary Examiner—Arhtur T. McKeon
Attorney—Vernon F. Hauschild

ABSTRACT: A split-power transmission in which a high-speed engine drives a substantially lower speed drive shaft, such as a helicopter rotor drive shaft, through a counterrotating epicyclic gear unit in which the oppositely rotating planet carrier and ring gear are drivingly connected to opposite sides of the drive shaft to provide substantially equal load, split power paths thereto and, preferably, wherein a second such transmission connects a second engine to the drive shaft so that there are four substantially equal load equally spaced drive gear connections to the drive shaft.

INVENTOR
GRAHAM WHITE
BY Vernon F. Hauschild
ATTORNEY

SPLIT-POWER TRANSMISSION

The invention herein described was made in the course of or under a contract or subcontract thereunder with the U.S. Army Aviation Material Laboratories.

BACKGROUND OF THE INVENTION

1. Field of Invention

This invention relates to transmissions and more particularly to split-power transmissions which are adapted to receive power from a high-speed engine, such as a modern turbine engine, and transmit power therefrom to a drive shaft, such as a helicopter rotor drive shaft, which rotates at a substantially slower speed and wherein the engine power being transmitted to the drive shaft is transmitted by the transmission through two equally loaded drive paths.

2. Description of the Prior Art

In the transmission art wherein power is to be transmitted from a very high-speed source to a much slower operating driven mechanism, such as a modern turbine engine driving a helicopter rotor drive shaft, four stages of speed reduction are usually required. This four stage speed reduction is usually accomplished by using two bevel reduction stages, or a bevel and a spur gear reduction, followed by two planetary gear systems connected in series with each having fixed ring gears and being interconnected such that the sun gear of the first system is driven by the engine, such that the sun gear of the second system is driven by the planted carrier of the first system, and such that the helicopter drive shaft is driven by the planet carrier of the second system. Such a system is not of the split power variety and, since all the reduction stages must carry full engine load, it is necessary that particularly strong and hence heavy parts be utilized in this system, thereby producing a heavy transmission. When such a transmission is used in a helicopter environment, since the aircraft engines are normally oriented in a horizontal direction and the helicopter rotor drive shaft is normally oriented in a vertical direction, it is necessary that the transmission perform the function of turning-the-corner between the horizontal engine and the vertical rotor drive shaft, and this necessarily adds parts, weight, and complication to the system. The weight problem of this conventional system is added to by the fact that the freewheeling unit which must be located therein to prevent the rotor from driving the engine must be sufficiently strong to take full engine power and torque, and therefore must be of a heavy construction. In this conventional system, any failure anywhere in the transmission will disable the entire system so that the engine cannot drive the rotor. In addition, when this conventional system is used in the helicopter environment it is inefficient since the losses in a transmission drive system are proportional to the number of system reduction stages, and this conventional system has four such reduction stages. It will therefore be seen that this system is inefficient due to the high losses caused by the four reduction stages. Such a conventional system is shown in USAAVLABS Technical Report 65–40 dated Oct. 1965 by Lester R. Burroughs and entitled "Power Transmission Studies for Shaft-Driven Heavy-Lift Helicopters," and available from DDC (Defense Documentation Center).

A second prior art transmission is disclosed in U.S. Pat. No. 3,062,073, and this transmission has some advantages over the previously described conventional transmission in that it has split power path, although not of equal loading. Such a transmission is an in-line arrangement and therefore presents problems in the helicopter environment in rounding the corner between the horizontally disposed engines and the vertically disposed rotor drive shaft, and the speed reduction ratio advantage gained therein over the above-described conventional design is offset by the weight added when this in-line system is installed in a helicopter. As a matter of fact, such a construction is presently used in the Russian MIL 10 series helicopter and can be tolerated solely because of the enormous size of the helicopter. To attempt to use such a system in a smaller helicopter would present substantial payload problems. To provide a system for helicopter operation utilizing such a transmission would require a horizontal-to-vertical drive conversion and hence an inefficient four reduction stage system. While this transmission is of the split-power variety, the power drives involved carry approximately one-third and two-thirds of the engine torque, respectively, and to modify this construction to produce an even power split arrangement could only be done at the expense of a substantial sacrifice in speed reduction ratio. Accordingly, in this system, all parts must be sized to be able to carry two-thirds of the engine torque load and this creates a heavy system. The weight problem of this system is further added to by the fact that the system has but a single output and accordingly, when used as an engine reduction gearbox, a single load path to the rotor so that heavier gears and parts must be used in this single output path to be able to carry full rotor and engine loading, thereby necessitating heavy parts.

A two-engined helicopter transmission is redundant up to the point at which power from the engines is combined. If the mechanism of U.S. Pat. No. 3,062,073 is used so that its single output shaft directly drives a helicopter rotor, as in the MIL series helicopters, a failure in the mechanism leads to complete loss of power to the rotor and thus the final two reduction stages provided by U.S. Pat. No. 3,062,073 would not be redundant.

If the mechanism of U.S. Pat. No. 3,062,073 were connected directly to each engine, i.e. as an engine reduction gearbox, it would be necessary to add two, or three, additional reduction stages to obtain further speed reduction, and to turn the angle between the engine axis and the helicopter rotor axis. There would, therefore be at least two reduction stages after the power from the two engines had been combined, and a failure in either of these final reduction stages would lead to complete loss of power to the helicopter rotor.

While there are other split power systems in the prior art, such as U.S. Pat. No. 2,770,149, it should be noted that these two path constructions are for the purpose of driving two counterrotating rotors as opposed to driving a single rotor as in this invention.

SUMMARY OF INVENTION

A primary objective of the present invention is to provide a split power transmission adapted to connect a high rotary speed power source to a mechanism to be driven at a much lower rotational speed, in which there are dual-drive paths between the transmission and the mechanism being driven and which substantially share equally the load being transmitted from the power source to the driven mechanism. In a two or more engined installation the two drive paths from each engine are not combined until the final gear mesh, thus giving drive train redundancy up to this point.

In accordance with the present invention, the transmission includes an epicyclic gear unit in which the sun gear is driven by the power source so as to cause the ring gear and the planet carrier to rotate in opposite directions and so that the two power paths between the transmission and the driven mechanism include the ring gear and the planet carrier, respectively.

In accordance with further aspects of the present invention, a transmission is taught which is capable of operating at reduced speeds, thereby reducing the centrifugal loads on the epicyclic unit parts so that these parts may be fabricated of a light construction.

It is still a further teaching of the present invention that the redundant drive paths from the epicyclic unit emanate from a ring gear and a planet carrier which rotate in opposite directions, but which drive trains drive the drive shaft of the driven mechanism in the same direction since they are operatively connected thereto on opposite sides thereof.

It is still a further objective of this invention to teach such a transmission which produces a high-speed reduction ratio and which is light in weight, and which is highly efficient in that it includes a minimum number of reduction stages.

It is still a further objective of this invention to teach such a transmission which is adapted to drive a flared drive shaft of sufficient dimension to envelope accessories such as oil coolers, control mechanisms and so forth.

It is a further teaching of this invention that two power sources drive the drive shaft of the mechanism to be driven through split power transmission of the type described above, wherein the redundant drive train between each power source and the drive shaft are substantially equally loaded, thereby permitting the parts thereof to be made of minimum weight design, and wherein a balanced drive is provided to the drive shaft since four equally spaced drive gears impart equal loads thereto.

It is still a further object of this invention to teach such a transmission which includes a freewheeling unit to allow shutdown of one of the engines and which is located in the least loaded of the drive trains so that it can be sized for handling the smallest horsepower drive therethrough.

It is still a further object of this invention to teach such a transmission system which is capable of converting drive from a horizontally oriented engine to a vertically oriented drive shaft, such as a helicopter rotor drive shaft, using the same gearing that insures equal splitting of the power in the redundant drive paths created thereby between the engine and the drive shaft and wherein the lift forces on the rotor shaft bearings can be reduced to any desired value by use of helical teeth of suitable helix angle on the final speed reduction stage.

It is still a further object of the present invention to teach such transmission system wherein the power source, such as an engine, is readily accessible for maintenance and the epicyclic unit and the freewheel are readily and externally accessible for removal from the transmission housing.

It is still a further object of the present invention to teach such a transmission system which, when used in a double-engine drive embodiment, will be partially redundant in that any failure occurring between the combining gear and the first engine will not affect the operation of the second engine so that the driven mechanism can continue to be driven thereby.

BRIEF DESCRIPTION OF THE DRAWINGS

Referring to FIG. 1 we see my split-power transmission 10 connecting horizontally oriented, rotary power source 12 to drive a vertically oriented drive shaft 14. Power source 12 may be an engine of the type taught in U.S. Pat. Nos. 2,711,631 or 2,747,367 and which rotates at a very high speed, such as 30,000 r.p.m. and generates 2,000 horsepower.

Figure 1:
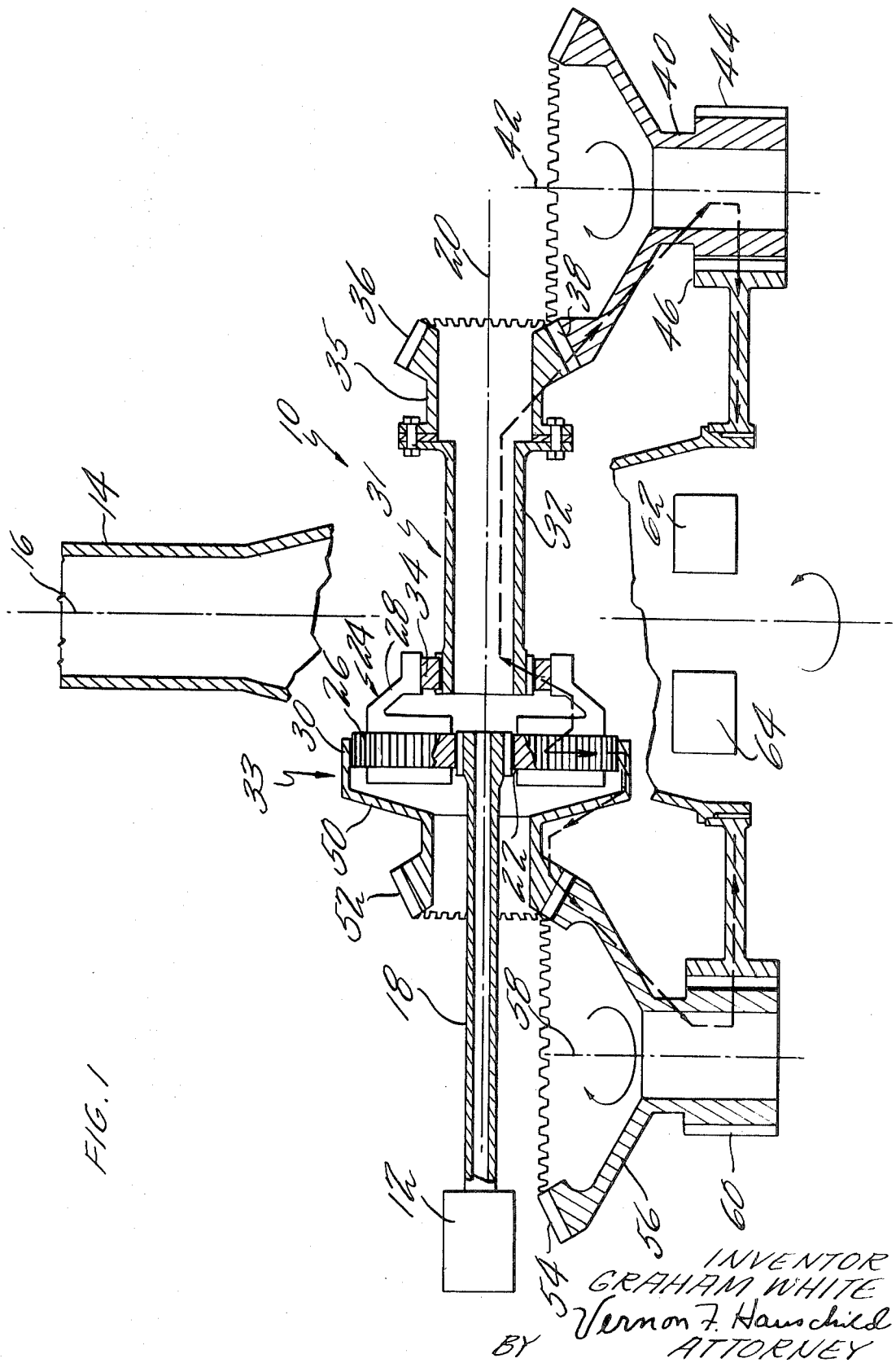
FIG. 1 is a showing of my split-power transmission connected to drive a vertically oriented drive shaft from a horizontally oriented engine.

Shaft 14 is mounted in a conventional fashion for rotation substantially about vertical axis 16, and is adapted to drive a mechanism such as a helicopter rotor at a speed of about 220 r.p.m. It will therefore be seen that my transmission must be capable of producing a very substantial speed reduction, must be able to convert horizontal drive to vertical drive with the axes of the engine and rotor intersecting or separated and must be light in weight so as to be capable of use in an aircraft-type environment. These functions are performed by my transmission, in part, because the transmission is of the split-power type and hence can be made of lighter parts.

Engine 12 drives shaft 18, which is mounted in conventional fashion to be rotatable about horizontal axis 20. Shaft 18 carries sun gear 22 of epicyclic unit 24. Epicyclic unit 24 also has a plurality of equally spaced planetary gears 26 whose teeth mesh with and are driven by the teeth of sun gear 22. The planets 26 are equally spaced circumferentially about sun gear 22 and are retained in position in conventional fashion within planet carrier 28. Each of planet gears 26 engage the teeth of ring gear 30 in mating relation, and it will be seen that sun gear 22 serves to drive planet gears 26 and planet carrier 28 in one rotary direction and ring gear 30 in the opposite rotary direction about horizontal axis 20.

The power split in my transmission 10 takes place between planet carrier 28 and ring gear 30, which are rotating in opposite directions. The drive train 31, driven by planet carrier 28 will now be described. Carrier 28 drives horizontally oriented shaft 32 through conventional freewheel unit 34, which may be of the type more fully described in U.S. Pat. No. 2,031,783, and which serves the function of permitting the engine 12 to drive the drive shaft 14, but preventing the drive shaft 14 from driving the engine 12. The freewheel 34 can be placed in either the ring gear drive line or, as shown for convenience, in the planet carrier drive line and it is preferable to position freewheel unit 34 in the most lightly loaded of the two split-power drive trains so that it can be of the lightest possible construction. Shaft 32 is connected to drive horizontally oriented bevel gear 35 whose teeth 36 form a selected angle with axis 20. The teeth 36 of bevel gear 35 operatively mate with the beveled gear 38 of drive shaft 40, which is mounted to be rotatable about substantially vertical axis 42, and which also carries spur gear 44, which is operatively connected to the combining spur gear 46 of rotor drive shaft 14. Any of these gears could as well have helical teeth.

It will therefore be seen that horizontally disposed engine 12 drives shaft 18 which carries sun gear 22 of epicyclic unit 24 and which, in turn drives planet carrier 28, shaft 32, bevel gear 35, beveled and spur geared drive shaft 40 and combining gear 46, to drive the substantially vertically oriented drive shaft 14 in what constitutes the first of the drive trains between the engine 12 and the drive shaft 14 of the rotor.

The second split-power path 33 commences with ring gear 30, which is connected, integrally or otherwise, to drive shaft 50, which has bevel gear 52 mounted concentrically about axis 20 at opposite end thereof. It will be noted that the teeth of bevel gear 52 form a selected angle with axis 20 and matingly engage the bevel gear 54 of drive shaft 56, which is mounted for rotation about substantially vertical axis 58. Drive shaft 56 is similar to drive shaft 40 and includes spur gear 60 which is in mating relation with the combining gear 46 on the opposite side thereof from drive shaft 40. It will be accordingly seen that the second drive train between the engine 12 and drive shaft 14 is through drive shaft 18, sun gear 22, planet gears 26, ring gear 30, bevel gear 52, and drive shaft 56 to the combining gear 46 of shaft 14.

An important feature of my transmission is not only that it is a split-power transmission but that substantially equal power is carried through the two load paths 31 and 33. As an example, of a transmission construction which will produce the desired equal-load two-path feature of this invention, the structure disclosed herein will be described in relevant detail concerning the power being transmitted through the speed of the various shafts and the number of teeth on the various gears, and the DP (diametral pitch) thereof.

Engine 12 develops 2,000 hp. and rotates at 30,000 r.p.m.. In epicyclic unit 10, sun gear 22 has 25 teeth of 12 DP, ring gear 30 has 137 teeth of 12 DP and there are three planet gears 26 each having 56 teeth of 12 DP. Shaft 50 of load path 33 rotates at 2,713 r.p.m. and carries 990 hp. Gear 52 has 19 teeth of 3 DP, while gear 54 has 43 teeth of 3 DP so that shaft 56 rotates at 1,199 r.p.m. and carries 990 hp. Spur gear 60 has 25 teeth of 4 DP while combining gear 46 has 134 teeth of 4 DP. Planet carrier 28, shaft 32 and gear 36 of load path 31 rotate at 2,341 r.p.m. and carry 1,010 hp. Gear 36 has 21 teeth of 3 DP and gear 38 has 41 teeth of 3 DP. Shaft 40 rotates at 1,199 r.p.m. to cooperate with shaft 56 in rotor drive shaft 14 at 224 r.p.m.

It will be seen that with the combination of parts depicted and described herein, this equal-load, split-power transmission is achieved but it will be obvious to those skilled in the art that other combinations of parts could produce the same result.

It will further be noted that since the combination of parts taught herein causes the planet carrier 28 to rotate at a little over 2,300 r.p.m., as opposed to the 30,000 r.p.m. speed of the engine 12, the epicyclic unit 24, and the other rotating parts are subjected to substantially reduced centrifugal loads and hence need minimal support and need be made of minimal weight to carry this reduced load. The reduction ratio of the overall transmission system is approximately 134 to 1, with a reduction ratio of 11.07 occurring in the ring gear driven load path 33 and with a reduction ratio of 12.83 occurring in the planet cage driven load train 31. If ring gear 30 has been fixed, contrary to the teaching of this application, the reduction ratio through the epicyclic unit would have been reduced to 6.48. The reduction ratio in the spiral or bevel gear mesh of the ring gear drive train 33 is 2.26 and the reduction ratio in the spiral or bevel gear mesh of the planet carrier driven train 31 is 1.96, thereby permitting transmission unit 10 to be driven by engine 12 at 30,000 r.p.m. and to drive rotor shaft 14 at 224 r.p.m.

Although drive train 31 and 33 are rotating in opposite directions, they serve to drive shaft 14 in the same direction because drive shafts 40 and 56 are positioned on opposite sides of drive shaft 14 and its combining gear 46.

The greater the number of gear meshes on reduction stages which occur in a transmission system the less efficient the transmission system will be, and it is important to note that the transmission system shown in FIG. 1 has but three reduction stages and these occur at the counterrotating epicyclic unit 24, the bevel gears 36 and 52 and the spur gears 44 and 60.

Rotor drive shaft 14 is flared at its lower end and is therefore capable of receiving accessories, such as oil cooler 62 and rotor controls 64 which may be of the type taught in U.S. Pat. No. 2,630,184 and which serve to control the flight of the aircraft by controlling the pitch of the blades of the rotor being driven by shaft 14.

Figure 2:
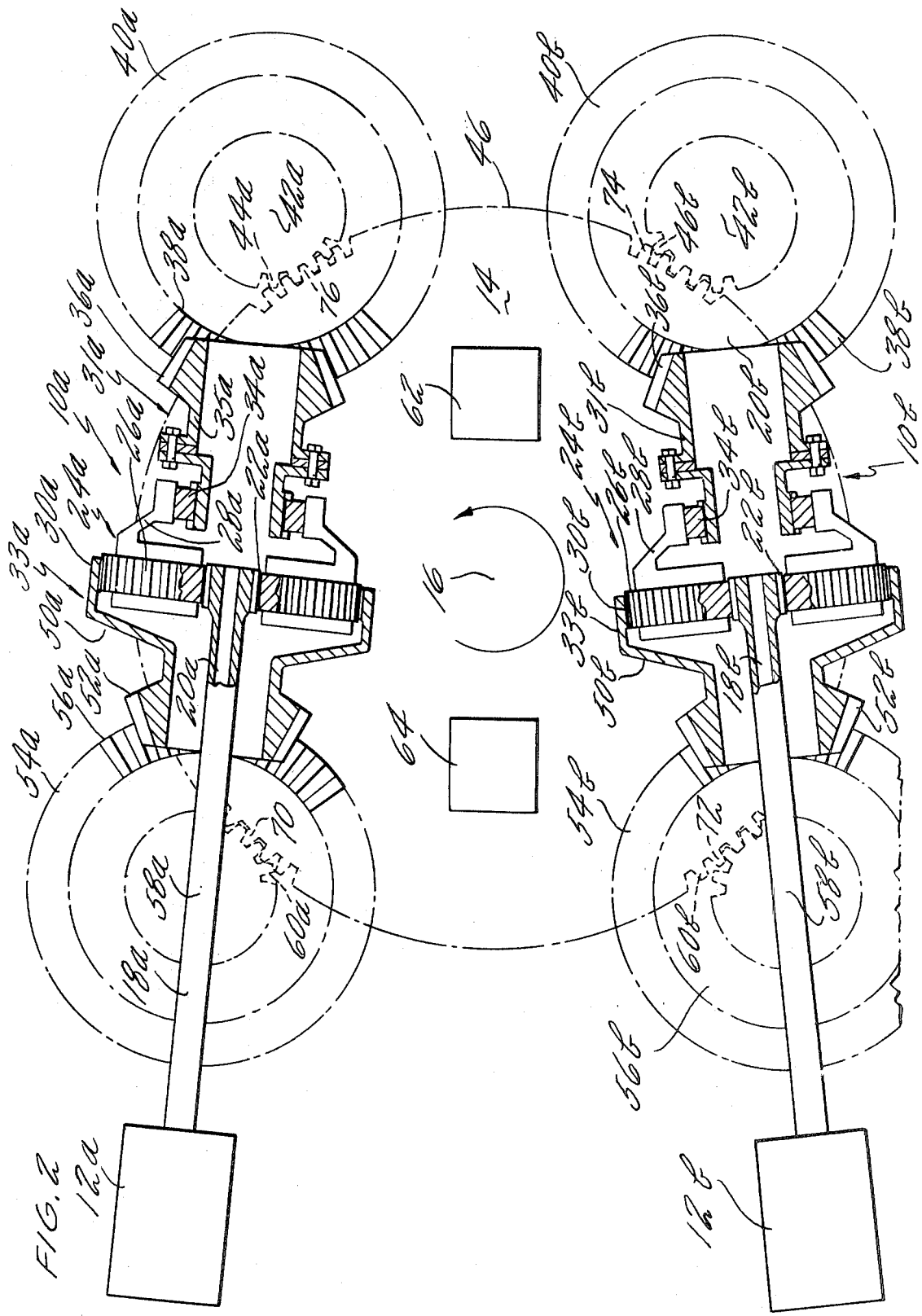
FIG. 2 shows the transmission used in a two-engine drive environment with provision for providing equal power split from each engine to the combining gear of a helicopter rotor through four substantially equal load paths.

Referring to FIG. 2 we see my split transmissions 10a and 10b connecting two engines 12a and 12b to combining gear 46 of a helicopter drive shaft 14, which is mounted for rotation about vertical axis 16. The same part numbers with "a" and "b" suffixes are used to designate corresponding parts to those previously designated in connection with the FIG. 1 construction. In the FIG. 2 two-engine configuration, the engines 12a and 12b act through transmission systems 10a and 10b, respectively, to provide a balance drive to rotor shaft 14 since the load is imparted thereto through the substantially equally loaded drive trains 31a, 33a, 31b and 33b to combining gear 46 at four substantially equally spaced positions or stations 70, 72, 74 and 76 about combining gear 46.

Gears 44 and 60 are spaced around, and mesh with, the combining gear 46 as shown in FIG. 2. If gears 44 and 60 and 46 have spur gear teeth (no helix angle) the tooth load will generate no axial load on either 44, 60 or 46. However, if gears 44 and 60 have a tooth helix angle such that the axial thrust on 44 is upwards in FIG. 2, then gear 46 will experience the same axial thrust from all four gears 44 and 60, but in a downward direction. Such a downward thrust on gear 46 is transmitted to the rotor shaft 14 and results in the bearings on 14, which lift the helicopter, being relieved of part of this load. Thus by appropriate choice of helix angle on 44, 60 and 46 the axial thrust on 46 can be chosen to reduce the axial load on the lift bearing by any desired amount, i.e. so that the load on the lift bearing is nominally zero. In such a case the additional axial thrust on 44 and 60 opposes the axial thrust of bevel gears 40 and 54 with the result that the lift generated by the helicopter rotor blades is transferred to the structural areas which support gears 40 and 54.

In the FIG. 2 construction, the freewheeling units 34a and 34b serve the additional function of permitting one of the engines 12a or 12b to be shut down at any time that the rotor is being driven by the single remaining engine. It will further be noted that in the FIG. 2 construction any failure which takes place in either transmission system between combining gear 46 and the engines 12a and 12b will not affect the operation of the remaining engine so that the rotor can continue to be driven.

By viewing either the FIG. 1 or the FIG. 2 construction, it will be evident that the remote location of the engines 12, 12a, and 12b from the remainder of the system makes them readily accessible for maintenance at any time, that the same gearing which converts horizontal-to-vertical drive also affects equal power splitting between the two power trains, and because the power being transferred from the engine to the rotor drive shaft through power trains 31a, 33a, 31b, and 33b is substantially equal, the various parts of these individual power trains, including their freewheeling units, can be of minimum weight design since it will carry minimum load, namely, one-half engine load. If we were to have an unbalanced power split construction, certain of the parts involved, notably the large-diameter combining gear 46, would have to be fabricated so as to be able to carry the larger of the two loads. It will further be evident that the FIG. 1 and 2 configurations are such that the engines and transmissions can be located within the fuselage of a helicopter, while the rotor drive shaft 14 is supported within the fuselage and projects vertically therefrom to drive the rotor in a conventional fashion.

I wish it to be understood that I do not desire to be limited to the exact details of construction shown and described, for obvious modifications will occur to a person skilled in the art.

I claim:

1. A transmission adapted for driving by connecting a high-speed engine to a drive shaft including:
   A. an epicyclic unit having:
      1. a sun gear adapted to be connected to and driven by the engine,
      2. a plurality of planet gears surrounding said sun gear and in mating relation therewith and positioned relative to one another by a planet carrier,
      3. a movable ring gear mounted to be driven by said planetary gears such that said ring gear and said planet carrier rotate in opposite directions,
   B. first drive means connecting said ring gear to said drive shaft and,
   C. second drive means connecting said planet carrier to said drive shaft.

2. Apparatus according to claim 1 and including a freewheeling unit located in said second drive means.

3. Apparatus according to claim 1 and including a freewheeling unit located in one of said drive means.

4. Apparatus according to claim 1 wherein said first and second drive means drivingly connect to substantially opposite sides of said drive shaft.

5. Apparatus according to claim 1 and including a second transmission adapted to connect a second high-speed engine to the drive shaft and including:
   A. an epicyclic unit having:
      1. a sun gear adapted to be connected to and driven by the engine,
      2. a plurality of planet gears surrounding said sun gear and in mating relation therewith and positioned relative to one another by a planet carrier,
      3. a movable ring gear mounted to be driven by said planetary gears such that said ring gear and said planet carrier rotate in opposite directions,
   B. first drive means connecting said ring gear to said drive shaft and,
   C. second drive means connecting said planet carrier to said drive shaft.

6. Apparatus according to claim 1 wherein said drive shaft is mounted for rotation about an axis and wherein each of said drive means includes:
   A. a drive shaft mounted coaxially with said drive shaft and including:
      1. a spur gear extending parallel to said axis and,
      2. a bevel gear with teeth forming an angle to said axis and,
   B. a mating spur gear connecting each of said spur gears of said first and second drive means drive shafts to said drive shaft and, C. a bevel gear in mating relationship with the bevel gear in the drive means drive shaft thereof so as to connect said first and second drive means drive shafts to said ring gear and said planet carrier, respectively.

7. A split-power transmission system adapted to connect a substantially horizontally oriented engine to a substantially vertically oriented drive shaft to be driven thereby at a substantially reduced rotary speed including:
  A. an epicyclic gear system mounted for rotation about a substantially horizontal axis and including:
    1. a sun gear adapted to be connected to said engine and mounted to be driven thereby about a substantially horizontal axis,
    2. a plurality of planet gears meshing with and driven by said sun gear,
    3. a planet carrier supporting each of said planet gears in equal circumferential relationship about said sun gear and adapted to rotate with said planet gears about said sun gears,
    4. a ring gear mounted for rotation about and in mating relation with said planet gears so that rotation of said sun gear will cause said planet carrier and said ring gear to rotate in opposite directions,
  B. a combining gear connected to said drive shaft in driving relation,
  C. a first drive train connecting said planet carrier to said combining gear and including:
    1. a bevel gear mounted for rotation for about a substantially horizontal axis and connected to said planet carrier to be driven thereby,
    2. a drive shaft mounted for rotation about a substantially vertical axis and including:
      a. a bevel gear mating with said bevel gear and,
      b. a spur gear mating with said combining gear so that rotation of said planet carrier causes rotation of said bevel gear, said drive shaft and said combining gear,
  D. a second drive train connecting said ring gear to said combining gear and including:
    1. a bevel gear mounted for rotation about a substantially horizontal axis,
    2. means connecting said bevel gear to said ring gear to be driven thereby,
    3. a drive shaft mounted for rotation about a substantially vertical axis and including:
      a. a bevel gear matingly engaging said bevel gear of said second drive train and,
      b. a spur gear connected to said combining gear of said drive shaft at a station substantially diametrically opposed from the location of the spur gear of the first drive train on said combining gear so that rotation of said ring gear will cause rotation of said bevel gear and said drive shaft of said second drive train so as to drive said combining gear and hence said drive shaft in the same direction as it is being driven by said first drive train.

8. Apparatus according to claim 7 and including a freewheeling unit located in one of said drive trains.

9. Apparatus according to claim 7 wherein the teeth of each of said gears are numbered and sized so that each of said drive trains carries substantially one-half engine power.

10. Apparatus according to claim 9 and wherein said gears of said epicyclic unit have selected numbers of gears so that a reduction ratio of about 10-to-1 occurs between said engine and said planet carrier.

11. A power system including:
  A. a first transmission adapted for driving by connecting a first high-speed engine to a drive shaft adapted to rotate at a relatively low speed including:
    1. an epicyclic unit having:
      a. a sun gear adapted to be connected to and driven by the first engine,
      b. a plurality of planet gears surrounding said sun gear and in mating relation therewith and positioned relative to one another by a planet carrier,
      c. a movable ring gear mounted to be driven by said planetary gears such that said ring gear and said planet carrier rotate in opposite directions,
    2. first drive means connecting said ring gear to said drive shaft and,
    3. second drive means connecting said planet carrier to said drive shaft,
  B. a second transmission adapted to connect a second high-speed engine to the drive shaft and including:
    1. an epicyclic unit having:
      a. a sun gear adapted to be connected to and driven by the second engine,
      b. a plurality of planet gears surrounding said sun gear and in mating relation therewith and positioned relative to one another by a planet carrier,
      c. a movable ring gear mounted to be driven by said planetary gears such that said ring gear and said planet carrier rotate in opposite directions,
    2. first drive means connecting said ring gear to said drive shaft and,
    3. second drive means connecting said planet carrier to said drive shaft,
  C. a combining gear operatively connected to said drive shaft and wherein said first and second drive means of said first and second transmissions operatively engage said combining gear at substantially equally spaced circumferential stations thereabout.

12. Apparatus according to claim 11 and including a freewheeling unit in one of said drive means in said first or second transmissions.

13. Apparatus according to claim 11 wherein said first and second engines are of equal power and wherein said first and second drive means of said first and second transmissions each carry substantially one-half engine power so that substantially equal power loading is imparted to said combining gears.

14. A drive mechanism including:
  A. a first split-power transmission system adapted to connect a first substantially horizontally oriented engine to a substantially vertically oriented drive shaft to be driven thereby at a substantially reduced rotary speed including:
    1. an epicyclic gear system mounted for rotation about a substantially horizontal axis and including:
      a. a sun gear adapted to be connected to said engine and mounted to be driven thereby about a substantially horizontal axis,
      b. a plurality of planet gears meshing with and driven by said sun gear,
      c. a planet carrier supporting each of said planet gears in equal circumferential relationship about said sun gear and adapted to rotate with said planet gears about said sun gears,
      d. a ring gear mounted for rotation about and in mating relation with said planet gears so that rotation of said sun gear will cause said planet carrier and said ring gear to rotate in opposite directions,
    2. a combining gear connected to said drive shaft in driving relation,
    3. a first drive train connecting said planet carrier to said combining gear and including:
      a. a bevel gear mounted for rotation about a substantially horizontal axis and connected to said planet carrier to be driven thereby,
      b. a drive shaft mounted for rotation about a substantially vertical axis and including:
        i. a bevel gear mating with said bevel gear and,
        ii. a spur gear mating with said combining gear at a first station thereon so that rotation of said planet carrier causes rotation of said bevel gear, said drive shaft and said combining gear,
    4. a second drive train connecting said ring gear to said combining gear and including:
      a. a bevel gear mounted for rotation about a substantially horizontal axis,
      b. means connecting said bevel gear to said ring gear to be driven thereby, c. a drive shaft mounted for rotation about a substantially vertical axis and including:
   i. a bevel gear matingly engaging said bevel gear of said second drive train and,
   ii. a spur gear connected to said combining gear of said drive shaft at a second station thereon so that rotation of said ring gear will cause rotation of said bevel gear and said drive shaft of said second drive train so as to drive said combining gear and hence said drive shaft in the same direction as it is being driven by said first drive train, B. a second split power transmission system adapted to connect a second substantially horizontally oriented engine to said substantially vertically oriented drive shaft to be driven thereby at a substantially reduced rotary speed including:
  1. an epicyclic gear system mounted for rotation about a substantially horizontal axis and including:
     a. a sun gear adapted to be connected to said engine and mounted to be driven thereby about a substantially horizontal axis,
     b. a plurality of planetary gears meshing with and driven by said sun gear,
     c. a planet carrier supporting each of said planet gears in equal circumferential relationship about said sun gear and adapted to rotate with said planet gears about said sun gears,
     d. a ring gear mounted for rotation about and in mating relation with said planet gears so that rotation of said sun gear will cause said planet carrier and said ring gear to rotate in opposite directions,
  2. a combining gear connected to said drive shaft in driving relation,
  3. a first drive train connecting said planet carrier to said combining gear and including:
     a. a bevel gear mounted for rotation for about a substantially horizontal axis and connected to said planet carrier to be driven thereby,
     b. a drive shaft mounted for rotation about a substantially vertical axis and including:
        i. a bevel gear mating with said bevel gear and,
        ii. a spur gear mating with said combining gear at a third station thereon so that rotation of said planet carrier causes rotation of said bevel gear, said drive shaft and said combining gear,
  4. a second drive train connecting said ring gear to said combining gear and including:
     a. a bevel gear mounted for rotation about a substantially horizontal axis,
     b. means connecting said bevel gear to said ring gear to be driven thereby,
     c. a drive shaft mounted for rotation about a substantially vertical axis and including:
        i. a bevel gear matingly engaging said bevel gear of said second drive train and,
        ii. a spur gear connected to said combining gear of said drive shaft at a fourth station thereon so that rotation of said ring gear will cause rotation of said bevel gear and said drive shaft of said second drive train so as to drive said combining gear and hence said drive shaft in the same direction as it is being driven by said first drive train and so that said first, second, third, and fourth stations are substantially equally positioned circumferentially about said combining gear and wherein said first and second drive trains of said first and second split-power systems carry about one-half engine load.